US006685482B2

United States Patent
Hopp et al.

(10) Patent No.: US 6,685,482 B2
(45) Date of Patent: Feb. 3, 2004

(54) METHOD AND SYSTEM FOR CREATING AND EVALUATING QUIZZES

(76) Inventors: Theodore H. Hopp, 303 Kent Oaks Way, Gaithersburg, MD (US) 20878; Marsha A. Hopp, 303 Kent Oaks Way, Gaithersburg, MD (US) 20878

( * ) Notice: Subject to any disclaimer, the term of this patent is extended or adjusted under 35 U.S.C. 154(b) by 185 days.

(21) Appl. No.: 09/834,843

(22) Filed: Apr. 13, 2001

(65) Prior Publication Data

US 2002/0161732 A1 Oct. 31, 2002

Related U.S. Application Data

(60) Provisional application No. 60/197,329, filed on Apr. 14, 2000.

(51) Int. Cl.[7] .................................................. G09B 7/00
(52) U.S. Cl. ...................... 434/323; 434/322; 434/350; 434/118; 434/362; 434/336
(58) Field of Search ................................ 434/350, 322, 434/323, 118, 362, 336; 463/9

(56) References Cited

U.S. PATENT DOCUMENTS

| | | | |
|---|---|---|---|
| 5,494,444 A | | 2/1996 | Thayer et al. |
| 5,727,950 A | * | 3/1998 | Cook et al. ................. 434/350 |
| 5,890,911 A | | 4/1999 | Griswold et al. |
| 5,987,443 A | | 11/1999 | Nichols |
| 6,029,156 A | | 2/2000 | Lannert |
| 6,099,320 A | * | 8/2000 | Papadopoulos ......... 434/322 X |
| 6,112,049 A | * | 8/2000 | Sonnenfeld ............. 434/350 X |
| 6,149,441 A | * | 11/2000 | Pellegrino et al. ...... 434/350 X |
| 6,162,060 A | * | 12/2000 | Richard et al. ......... 434/118 X |
| 6,164,974 A | | 12/2000 | Carlile et al. |
| 6,315,572 B1 | * | 11/2001 | Owens et al. ........... 434/322 X |
| 6,347,943 B1 | * | 2/2002 | Fields et al. ............ 434/118 X |
| 6,513,042 B1 | * | 1/2003 | Anderson et al. ....... 707/102 X |
| 6,519,445 B2 | * | 2/2003 | Casey-Cholakis et al. .. 434/350 X |

* cited by examiner

Primary Examiner—S. Thomas Hughes
Assistant Examiner—Chanda L. Harris
(74) Attorney, Agent, or Firm—Harvey Kaye; Jerry Cohen; Perkins, Smith & Cohen, LLP

(57) ABSTRACT

Educational software using a computer and having a data storage system including a software module database management system and a user database management system. There is a quiz module database, maintained by the software module database management system, containing at least one quiz module, and a structured learning material editor module database, maintained by the software module database management system and containing at least one structured learning material editor modules. The software also has a structured learning material database, maintained by the user database management system, for storing at least one structured learning material data set created by a user. A user interface is provided for selecting system control functions, editing structured learning materials, presenting quizzes, receiving user answers to quizzes, and displaying quiz analysis results. A control system retrieves software modules from the software module database management system and activates them.

26 Claims, 11 Drawing Sheets

SYSTEM BLOCK DIAGRAM

STRUCTURED LEARNING
MATERIAL DATABASE FOR
MULTIPLE USERS

PROCESS OVERVIEW

SYSTEM FUNCTIONS

SYSTEM OPERATION

FIG. 7

| | |
|---|---|
| fork | el cuchillo |
| knife | la cuchara |
| | el cedazo |
| ladle | el tamiz |
| sieve | la olla |
| | el cucharón |
| spoon | el tenedor |
| pot | el plato |
| plate | el cazo |
| dish | |
| | |
| | |

FIG. 10

| | |
|---|---|
| 1. _____ | cucharón |
| 2. _____ | plato |
| 3. _____ | tamiz |
| 4. _____ | tenedor |
| 5. _____ | cuchillo |
| 6. _____ | cazo |
| 7. _____ | cedazo |
| 8. _____ | olla |
| 9. _____ | cuchara |

FIG. 8
SCREEN LAYOUT OF A MATCHING QUIZ FOR TOPICAL NOTES

| | |
|---|---|
| el pan | para el desayuno |
| los huevos | para el almuerzo |
| la ensalada | para la cena |
| el cereal | |
| el sandwich | |
| el pan tostado | |
| el pollo | |
| las verduras | |

FIG. 9
SCREEN LAYOUTS OF A MATCHING QUIZ FOR THE COMBINATION OF A WORD/DEFINITION LIST AND TOPICAL NOTES

| | |
|---|---|
| el sandwich | el tamiz |
| sieve | el tenedor |
| dish | el plato |
|  | para el desayuno |
| el pan tostado | para el almuerzo |
| el cereal | el cuchillo |
|  | para la cena |
| fork | la cuchara |
| los huevos | |
| el pan | |
| knife | |
| spoon | |

| | |
|---|---|
| pot | para el almuerzo |
| el pollo | el cedazo |
|  | el cucharón |
| ladle | la olla |
| la ensalada | el cazo |
|  | para la cena |
| plate | el plato |
| las verduras | |
| sieve | |

FIG. 11
SCREEN LAYOUT OF A MULTIPLE CHOICE QUIZ FOR A
WORD/DEFINITION LIST

```
5. el cuchillo
     a. knife
     b. spoon
     c. plate
     d. fork 6. knife
     a. el cuchillo
     b. el plato
     c. el tamiz
     d. el cucharón 7. pot
     a. el tamiz
     b. el cazo
     c. la olla
     d. el tenedor
```

1. ○a ○b ○c ○d
2. ○a ○b ○c ○d
3. ○a ○b ○c ○d
4. ○a ○b ○c ○d
5. ○a ○b ○c ○d
6. ○a ○b ○c ○d
7. ○a ○b ○c ○d
8. ○a ○b ○c ○d
9. ○a ○b ○c ○d
10. ○a ○b ○c ○d
11. ○a ○b ○c ○d
12. ○a ○b ○c ○d
13. ○a ○b ○c ○d
14. ○a ○b ○c ○d
15. ○a ○b ○c ○d

FIG. 12
SCREEN LAYOUT OF A MULTIPLE CHOICE QUIZ FOR
TOPICAL NOTES 1. para la cena
   a. el cereal
   b. los huevos
   c. el pan tostado
   d. el pollo 2. para el almuerzo
   a. el pan
   b. el cereal
   c. la ensalada
   d. los huevos 3. para el desayuno
   a. la ensalada
   b. las verduras
   c. el cereal
   d. el pan 1. ○ a  ○ b  ○ c  ○ d
2. ○ a  ○ b  ○ c  ○ d
3. ○ a  ○ b  ○ c  ○ d

METHOD AND SYSTEM FOR CREATING AND EVALUATING QUIZZES

CROSS-REFERENCE TO RELATED APPLICATIONS

The present application is related to provisional patent application filed on Apr. 14, 2000, Ser. No. 60/197,329.

FIELD OF THE INVENTION

The present invention relates generally to computer tools for education, and, more particularly to computer-based methods and systems for creating and evaluating quizzes and for creating structured learning materials which define the subject matter of the quizzes.

BACKGROUND OF THE INVENTION

Current quiz authoring systems provide forms for quiz authors to enter all of the data to create a particular type of quiz and to provide an evaluation of a student's responses. Typical quiz formats include multiple-choice, short answer, true-false, fill-in-the-blank, and matching. Such quizzes do not explicitly represent the underlying materials on which they are based. Each question, in a particular format and with its answers and feedback, is individually hand-crafted and stored for later use by a student.

Some current quiz authoring systems are embedded within more general-purpose computerized learning presentation systems or computer-assisted instructional systems. Here, the quizzes are tied to particular portions of course materials.

U.S. Pat. No. 5,890,911 discloses a computerized learning, response, and evaluation system that includes an embedded question-generation component. That system eliminates the requirement that the author explicitly write quiz questions. However, that system nevertheless requires the author of the learning materials to indicate, within the materials, what portions of the materials are to be used for questions and what are to be used for correct answers, and to further structure the materials to segregate incorrect answers (distracters) from the questions and correct answers. Such quizzes can only be used as part of the overall learning system.

In computer-assisted instructional systems, the learner's quiz responses are analyzed, tailored feedback is provided, and the results are also used to determine the learner's continuing path through the course material. This functionality is often implemented by means of a knowledge base with a rule-based inference engine, as in U.S. Pat. Nos. 5,987,443 and 6,029,156. The tailored quiz feedback that such systems provide will be helpful to the student, but the feedback functionality is tied to the larger system, limiting quiz reusability.

U.S. Pat. No. 6,164,974 discloses an evaluation-based learning system for the production, use and administration of courses, wherein a database of questions and answers are linked to a textbook. Creating such a database is generally labor-intensive. Furthermore, new editions of a textbook require a full review of the database.

A closely related technology is that of flashcard applications. Current flashcard applications provide the user with the means to enter data in a table with two or more columns, where each table row represents various pieces of information related to a single item. For example, a row might contain a word, its translation into French, and the definition of the word in French. These applications generate one or more types of quizzes based on two of the columns in the table. Correct answers are determined from the table. One such system is described in U.S. Pat. No. 5,494,444. The ability to generate quizzes from data represented in a table is very useful, but does not address the need to generate quizzes for learning materials represented in other ways. Examples of other representations for learning materials include maps, outlined notes, simple lists (ordered or unordered), and process charts.

Existing systems provide a variety of features to assist in preparing, presenting, and providing feedback for computer-based quizzes. Yet each type of system suffers from specific deficiencies in reusability, range of data representations, or automation of quiz and feedback generation. The need exists for a quiz generation and evaluation system which addresses these issues.

BRIEF SUMMARY OF THE INVENTION

One object of the present invention is to provide a learning system which operates from a database of structured learning materials to produce quizzes in multiple formats.

Another object of the present invention is to provide a learning system which produces quizzes from diverse forms of structured learning materials.

A further object of the present invention is to provide a learning system with an interface module architecture which allows the use of knowledge bases not necessarily designed for any specific type of quiz.

Still a further object of the present invention is to provide a learning system having a data-driven architecture that enables the use of new types of structured learning materials to generate quizzes in multiple, existing and additional formats without any change to existing structured learning materials or quiz generators.

Yet a further object of the present invention is to provide a learning system having a data-driven architecture that enables the generation of quizzes in multiple, additional formats using existing or additional structured learning materials, without any change to existing structured learning materials or quiz generators.

Yet another object of the present invention is to provide a learning system having a rule-driven analysis engine for examining an entire set of quiz responses simultaneously.

An additional object of the present invention is to provide a learning system which produces feedback on quiz responses based on categories of incorrect answers, which may include a single error or a set of related errors.

These and other objects are accomplished according to preferred embodiments of the invention. There is educational software using a computer and having a data storage system including a software module database management system and a user database management system. There is a quiz module database, maintained by the software module database management system, containing at least one quiz module, and a structured learning material editor module database, maintained by the software module database management system and containing at least one structured learning material editor modules. The software also has a structured learning material database, maintained by the user database management system, for storing at least one structured learning material data set created by a user. A user interface is provided for selecting system control functions, editing structured learning materials, presenting quizzes, receiving user answers to quizzes, and displaying quiz analysis results. A control system retrieves software modules from the software module database management system and activates them. There are at least one structured learning material editor, one editor being selected for use in editing structured learning material data in response to a request through the user interface. There is also a plurality of quiz modules, each including a generator, a presenter, and an analyzer, the generator transforming input data into screen presentation data and quiz answer analysis rules, the presenter, through the user interface, displaying the quiz to the user, accepting a user's answers to the quiz and displaying analysis results to the user on those answers, and the analyzer evaluating the user's answers to a presented quiz using the answer analysis rules provided by the generator. There may also be a data structure mapping module database, maintained by the software module database management system and containing at least one data structure mapping modules, and a plurality of data structure mapping modules, at least one of which is used to transform structured learning material data sets into input data for a quiz module. The present invention also includes the method carried out by the software, and the method of using the software.

Other objects, features and advantages will be apparent from the following detailed description of preferred embodiments taken in conjunction with the accompanying drawings in which:

BRIEF DESCRIPTION OF THE DRAWINGS

FIG. 7 is a schematic view of a screen layout of a matching quiz for a word/definition list.

FIG. 8 is a schematic view of a screen layout of a matching quiz for topical notes.

FIG. 9 is a schematic view of two screen layouts of a matching quiz for the combination of a word/definition list and topical notes.

FIG. 10 is a schematic view a screen layout of an alphabetize words quiz for a word/definition list.

FIG. 11 is a schematic view of a screen layout of a multiple choice quiz for a word/definition list.

FIG. 12 is a schematic view of a screen layout of a multiple choice quiz for topical notes.

DETAILED DESCRIPTION OF THE DRAWINGS

System Overview

Figure 1:
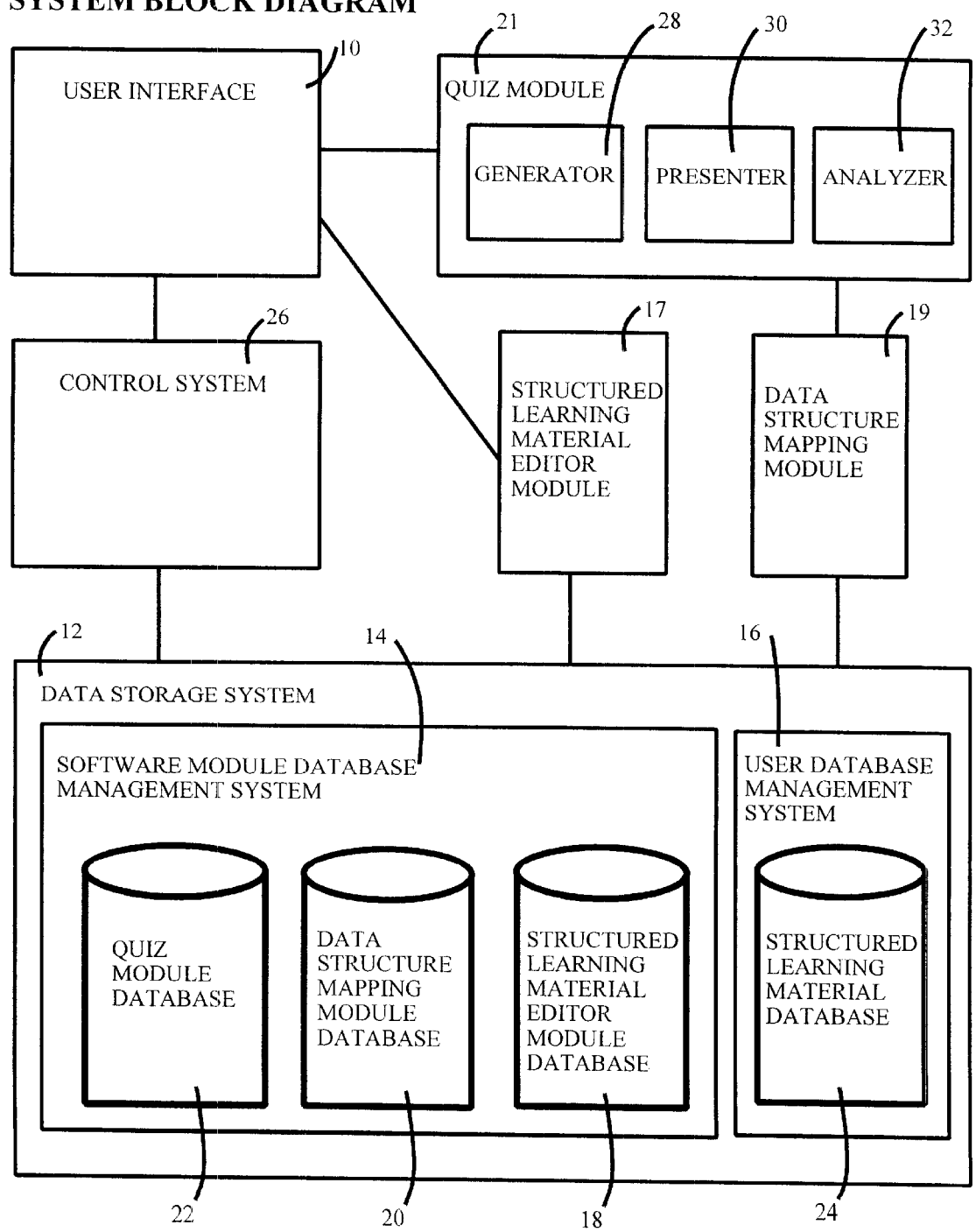
FIG. 1 is a system block diagram of the present invention.

The components of the present invention and their interactions may be understood through the system block diagram, as shown in FIG. 1. It should be understood that the block diagram of FIG. 1, and the other figures, show different functional blocks for a better understanding of the invention. However, the functions provided by more than one block can constitute a single structure which may combine the functions shown in the separate blocks; likewise, a single function block may be distributed among a larger number of interacting elements, on a single computer or over multiple computers interacting via a variety of communication methods, based on established computing technologies.

The user, through the user interface 10, directs the system to operate in one of two ways: (1) as an editor to allow the user to add, modify, or delete structured learning material, or (2) as a computerized quiz system to allow the user to take a quiz and to have the quiz answers analyzed and scored. The user interface interprets the user's actions, and relays the appropriate request(s) to the data storage system 12.

The data storage system 12 has a software module database management system 14 and a user database management system 16. The software module database management system 14 is the repository for an extensible collection of software modules for specialized structured learning material editors 17 located in a structured learning material editor module data base 18, data structure mapping modules 19 located in a data structure mapping module database 20, and quiz modules 21 located in a quiz module database 22. The user database 16 is the repository for the structured learning materials created by the user and located in a structured learning material database 24. (The structured learning material database 24 may also include a user profile, which may contain settings and preferences which the user may set through the user interface 10 and which affect the operation of other system components and may also contain a history of past user interaction with the system.) The database management systems 14 and 16 may be implemented using one or a variety of methods such as files stored on the local file system of a computer; as a commercial database management system; or as data made available through server scripts accessed over a computer network.

If the user has requested that the system act as an editor, the control system 26 asks the data storage system 12 to retrieve the appropriate structured learning material data from the user database 16 and corresponding structured learning material editor module 17 from the software module database 14. The user then interacts with the structured learning material editor module 17 through the user interface 10.

If the user has requested that the system act as a computerized quiz system, the control system 26 asks the data storage system 12 to retrieve the appropriate structured learning material data from the user database 16 and corresponding data structure mapping module 19 and quiz module 21 from the software module database 14. The user then interacts with the quiz module 21 through the user interface 10. The quiz module 21 itself comprises a generator 28, a presenter 30, and an analyzer 32. The generator 28 transforms input data from the data structure mapping module 19 (which is contained in the data structure mapping module database 20) into screen presentation data and quiz answer analysis rules; the presenter 30, through the user interface 10, displays the quiz to the user, accepts a user's answers to the quiz and displays analysis results to the user on those answers; and the analyzer 32 evaluates a user's answers to a presented quiz using the answer analysis rules provided by the generator 28.

The system may alternatively be configured without data structure mapping modules 19 and without the data structure mapping module database 20. In this case, each quiz module 21 accepts structured learning material data directly as input data. This alternative configuration, however, provides for less flexible system evolution, in that existing quiz modules 21 will not be able to make use of new structured learning material data types without modification.

Figure 2:
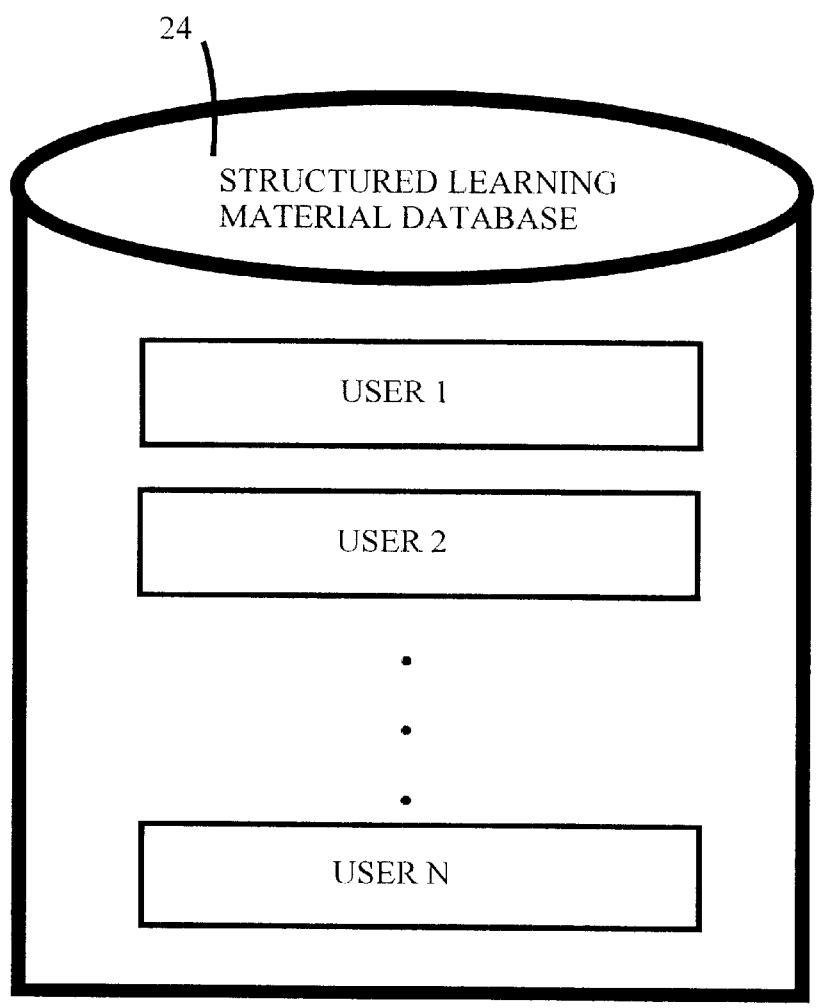
FIG. 2 is a block diagram of the structured learning material database for multiple users.

The user interface 10, control system 26, and user database management system 16 may also be implemented so as to support multiple users. In this case, the user interface 10 displays a request for user identity (possibly with identity authentication) and the control system 26 validates the user identity before the other system functions are made available. In addition, the user database management system 16 partitions the structured learning material database 24 into distinct areas for each user, as shown in FIG. 2. The control system 26 may also include functions to transfer structured learning material data between structured learning material databases 24 for different users, or for sharing structured learning material data among several users. The user interface 10, control system 26, quiz modules 21, and user database management system 16 may also provide functions for two or more users to collaborate in taking a quiz, either simultaneously or sequentially.

Process Overview

Figure 3:
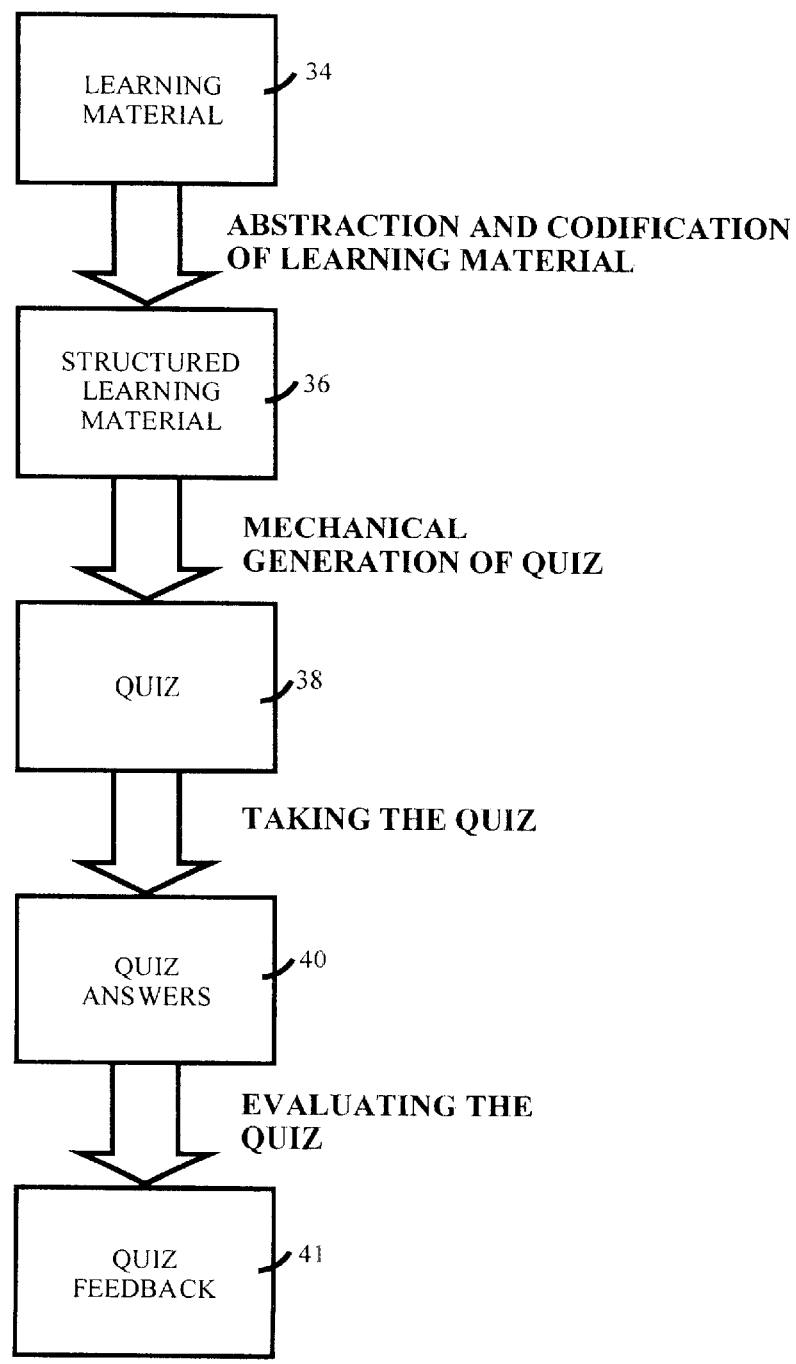
FIG. 3 is a process flow chart presenting an overview of the present invention.

In the present invention, a method and system architecture are provided to take advantage of similarities in various information structures in order to generate quizzes via a reusable set of quiz modules, and further, to add new information structures and quiz modules which can fully interoperate with existing system components. This section describes the underlying processes which enable the automatic generation, presentation, and evaluation of computer-based quizzes. These processes are outlined in four steps, as depicted in FIG. 3.

Step 1. Abstraction and Codification of Learning Material

The generation of any quiz begins with learning material which defines the domain of the quiz questions. The first step in the process is a transformation of this learning material 34 into one of an extensible number of data structures. Learning material so transformed is referred to as "structured learning material" 36 throughout the remainder of this document; each data structure into which learning material is transformed is referred to as a "structured learning material type."

In the present invention, an extensible collection of data structures, each with its own customized editor, supports the recording and storing of structured learning material 36 by the user. As examples, data structures and editors may be created to record and store: word lists in one or more languages; vocabulary lists in one or more languages; tables of dates and events; annotated maps; outlined notes; taxonomies; or diagrams with labels. A student, teacher, or other user, having derived information from assigned learning material, records the subject information organized as per the conforming data structure.

Step 2. Mechanical Generation of Quiz

The second step in the process is a transformation of the structured learning material into a quiz 38 of a specific type. Examples of such quiz types include: match related items; alphabetize words according to the rules of a particular language; multiple choice; place a list of items in sequence; and replace a missing word or phrase in a block of text.

This step proceeds in two phases. In the first phase, a quiz type is selected from an extensible set of supported quiz types. Associated with each quiz type is an "input data structure" for that type. Throughout the remainder of this document, an "input data structure" will refer specifically to the internal representation of data for use in a specific quiz type module.

The input data structure for each quiz type fully defines the data needed for quiz generation. It is a property of the quiz, not of the structured learning material. In the modular architecture, it serves to: (1) make quiz generation independent from specific structured learning material types, thereby ensuring that the addition of new structured learning material types will not affect the operation of the existing system, and (2) make quiz generation available to new structured learning material types, by providing a set of input specifications.

Also defined are the data structure mapping modules, an extensible set of methods for transforming structured learning material of one or more types into the particular input data structure for a specific quiz type. Those structured learning materials which can be transformed to the particular input data structure for the selected quiz type are identified. The first phase concludes by selecting at least one such structured learning material data set and applying the appropriate data structure mapping module to each selected data set, thereby generating data in the required input data structure.

The second phase of this step uses a method specific to the quiz type to transform data in the input data structure into a quiz. The quiz includes presentation data and analysis rules for generating feedback on quiz answers. This phase occurs without any additional input; it is the mechanical generation of the quiz.

Step 3. Taking the Quiz

The third step in the process is for the user to be presented with the quiz and to provide answers 40 to the quiz. The quiz is presented in a format governed by the presentation data, and provides an interface for the user to indicate answers. The user submits answers through the interface for evaluation.

Step 4. Evaluating the Quiz

The fourth step of the process is to analyze the user's answers, provide feedback on wrong answers or other aspects of the user's answers as appropriate, and to score the user's performance 41. The analysis rules are invoked to determine the relevant feedback for the user. The feedback rules may be organized, and their output controlled, in such a manner as to guide the user towards improved performance. For example, the feedback rules may be categorized into those providing formatting guidance, hints for achieving a better score, and indication of wrong answers.

Description of the System Functions

Figure 4:
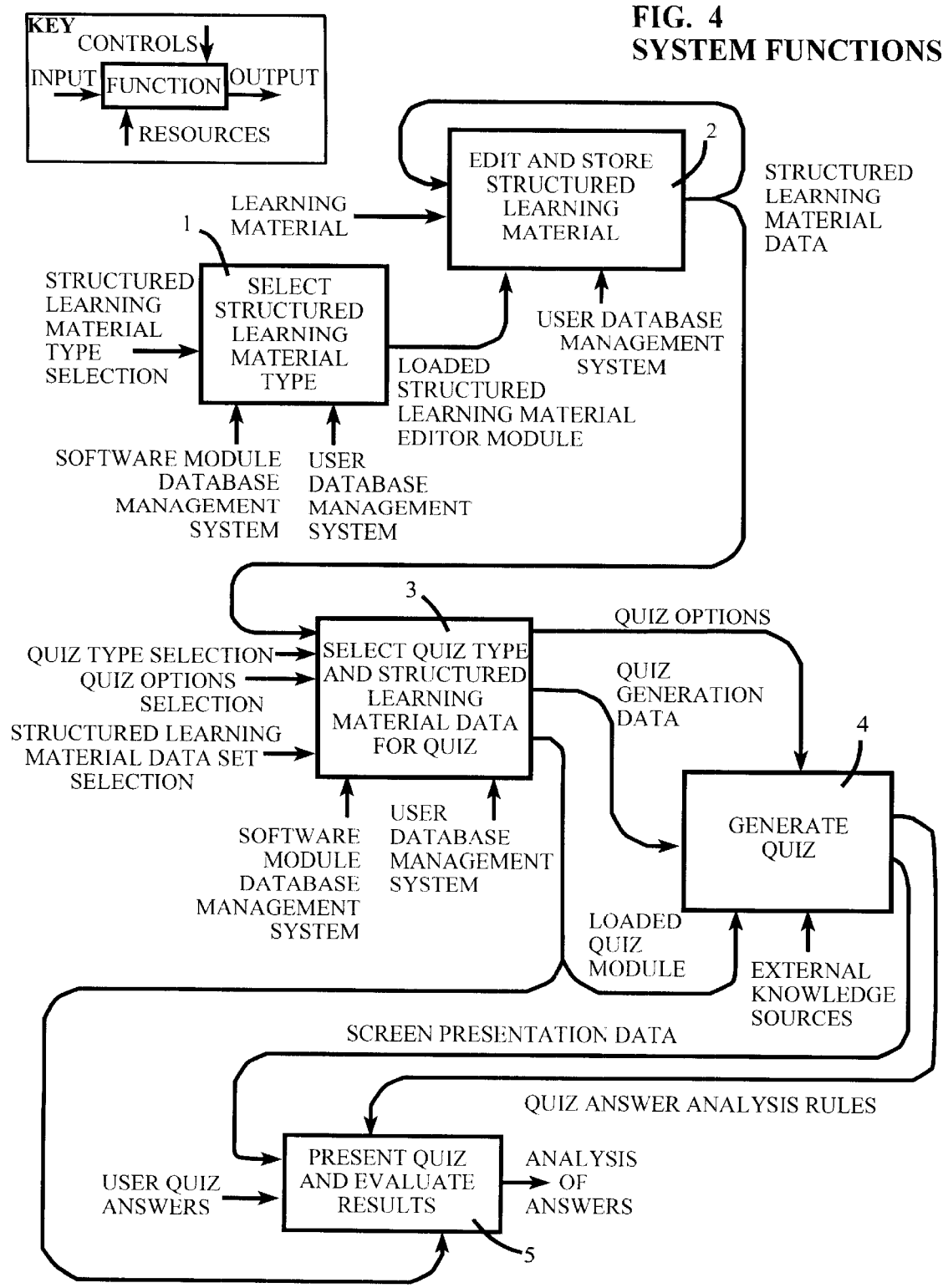
FIG. 4 is a system function chart.

The architecture of the proposed system comprises five functions which operate together to allow a user to take quizzes on structured learning materials which the user (or a second user) has created. As depicted in FIG. 4, the five functions are:

1. Select structured learning material type
2. Edit and store structured learning material
3. Select quiz type and structured learning material data set for quiz
4. Generate quiz
5. Present quiz and evaluate results Function (1) presents the user with an interface 10 for selecting a structured learning material type from a list of available types. This list of types is produced through Function (1) querying a database of the structured learning material editor modules 18, maintained by the software module database management system 14, for the names of all of the structured learning material types. The user may alternatively select an existing structured learning material data set to modify, which implicitly selects the structured learning material type. The list of existing structured learning material data sets is produced through Function (1) querying the structured learning material database 24 maintained by the user database management system 16. The user's selection (either explicit or implicit) of a specific structured learning material type causes the system to retrieve, from the software module database management 14 system, the associated structured learning material editor module from the module database 18 for use in Function (2).

Function (2) is performed by the structured learning material editor module loaded by Function (1) and presents the user with an interface 10 for editing and storing structured learning material data of the selected type. The interface 10 allows the user to enter new learning material in a format specific to the selected structured learning material type, to store those data in the structured learning material database 24 by means of the user database management system 16, and to later retrieve and modify the data so stored. The output of Function (2) is structured learning material data.

Function (3) presents the user with an interface 10 for selecting a quiz type from a list of available quiz types and then selecting, from among the structured learning material data sets stored in the structured learning material data base via Function (2), one or more such data sets to be used for creating a quiz of the selected type. (Alternatively, the interface is for selecting a single structured learning material data set and then selecting a quiz type.) Additionally, the interface allows the user to select quiz options, the options available being dependent on the selected quiz type. The list of quiz types and, for each type, the set of available options, is produced through Function (3) querying a database 22 of quiz modules maintained by the software module database management system 14.

Associated with each quiz type is an input data structure. Each quiz type is associated with a single input data structure, although any one input data structure may be associated with more than one quiz type. This association is produced as part of the process of producing the list of quiz types. Furthermore, associated with each input data structure is a list of structured learning material types that are compatible with it. A structured learning material type is compatible with an input data structure if there exists a data structure mapping module in the module database 20 that converts data of that structured learning material type to the input data structure. The list of available data structure mapping modules is produced by Function (3) querying a data structure mapping module database 20 maintained by the software module database management system 14. The interface 10 presented by Function (3) restricts the user to choosing a combination of quiz type and structured learning material data set(s) that are compatible.

The user's selection of a specific quiz type causes the system to retrieve and load the associated quiz module for use in Functions (4) and (5). The user's selection of structured learning material data set(s) causes the system to retrieve the selected data set(s) and their associated data structure mapping module(s) from the data structure mapping module database 20. Function (3) then applies the data structure mapping module(s) to the retrieved structured learning material data set(s) separately for each structured learning material data set selected by the user. Collectively, these mapped data sets, now transformed to the quiz input data structure, constitute the quiz generation data used as input to Function (4). The quiz options selected by the user are passed to Function (4) to control the quiz generation.

Function (4) is performed by the quiz module loaded by Function(3) and uses the quiz generation data generated in Function (3). The quiz module generates both the screen presentation data for the quiz and the quiz answer analysis rules for evaluating the user's quiz answers. (Typical operations of the quiz module for Function (4) may include, but are not limited to: combining data from multiple mapped data sets, partitioning the quiz into separate presentation screens, randomizing the questions and possible answers on each screen, and generating data structures representing acceptance criteria for user answers.) The operation of the quiz module is controlled by the quiz options selected by the user in Function (3); the manner of control is specific to each quiz module. (Typical controls may include, but are not limited to, setting the level of "hinting" provided to the user, establishing a time limit to the quiz, or specifying a language for the quiz.) Furthermore, the quiz module may also query external knowledge sources; that is, databases containing knowledge other than that provided by the user and use those external data in the quiz generation process. (Examples of external knowledge sources are an electronic dictionary, an electronic thesaurus, and a database of maps.) The screen presentation data and analysis rules are used in Function (5).

Function (5) is performed by the quiz module loaded by Function (3) and presents the user with an interface for selecting answers to the specified quiz and for receiving an analysis of those answers. Function (5) uses the screen presentation data output from Function (4) as a resource for constructing the interface. The analysis of the quiz answers is controlled by the analysis rules generated by Function (4).

Description of the System Operation

Figure 5:
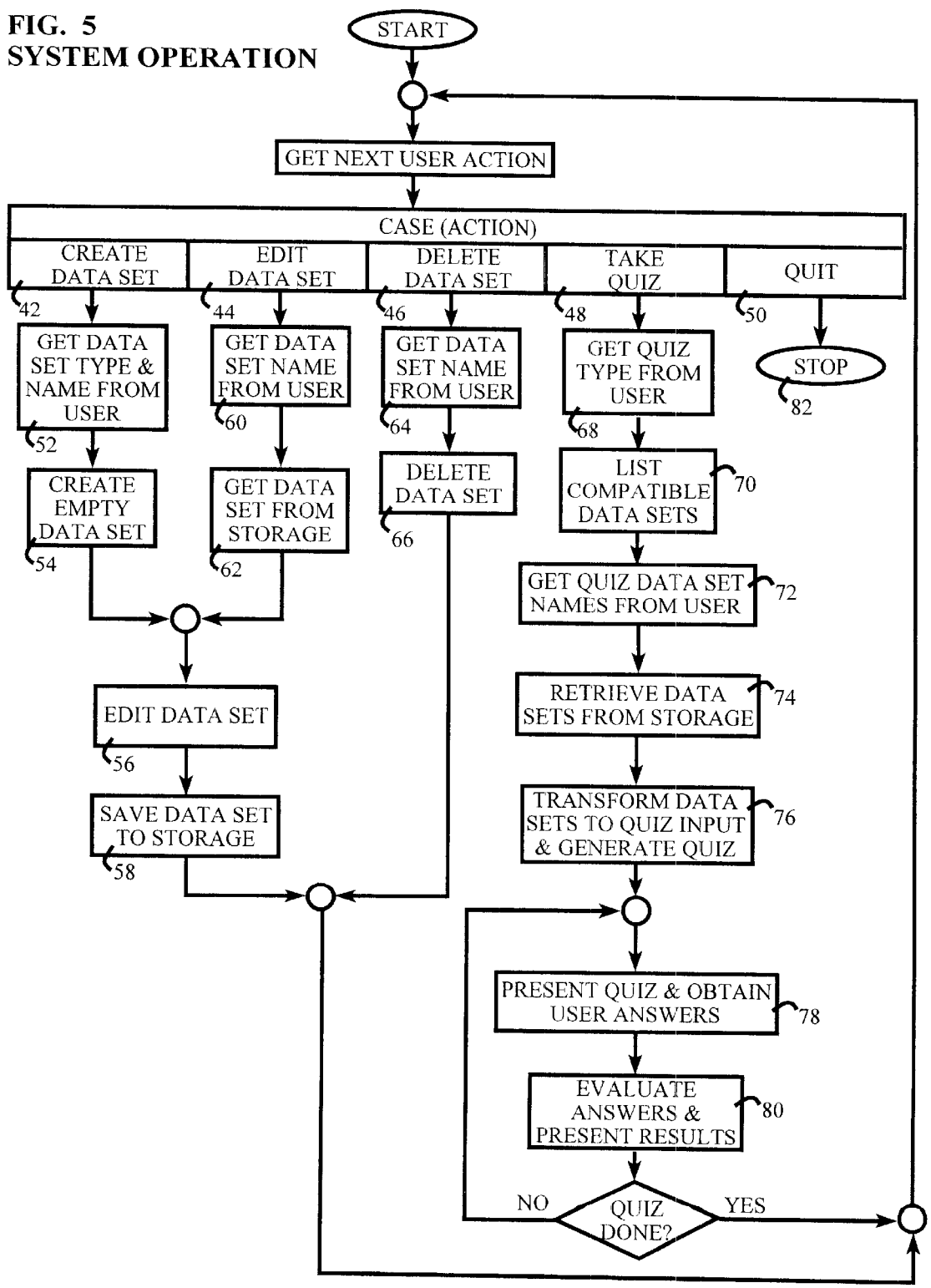
FIG. 5 is a flowchart of the system operation.

FIG. 5 presents a flowchart for the operation of a preferred embodiment of the invention. The overall operation of the system is controlled through a top level loop which waits for the next user action. There are five possible user actions at this level: (1) create a data set 42, (2) edit a data set 44, (3) delete a data set 46, (4) take a quiz 48, and (5) quit 50.

In case (1), create a data set 42, the user is prompted to enter the data set type and new data set name 52 into the system. The system then creates an empty data set 54 of that name and type in the structured learning material database 24. The user then edits 56 and saves 58 the data set. Once the user has saved the data set, the system returns to the top level loop and waits for the next user action.

In case (2), edit a data set 44, the user is prompted to enter the data set name 60 into the system. The system then retrieves that data set 62 from the structured learning material database 24. The user then edits 56 and saves 58 the modified data set. Once the user has saved the data set, the system returns to the top level loop and waits for the next user action.

In case (3), delete data set 46, the user is prompted to enter the data set name 64 into the system. The system then removes that data set 66 from the structured learning material database 24, returns to the top level loop, and waits for the next user action.

In case (4), take a quiz 48, the user is prompted to enter the name 68 of the desired quiz type into the system. The system then retrieves the names 70 of all of the compatible structured learning material data sets that are currently stored in the structured learning material database 24. The user is then prompted to select 72, from the list of compatible structured learning material data sets, the names of one or more data sets that the user wishes to use for the quiz. The system then retrieves 74 those data sets from the structured learning material database 24, transforms 76 those data sets into the quiz input data structure, and generates the quiz 76. The system then displays 78 the quiz to the user. The user now provides answers to the quiz 78, and the system evaluates 80 those answers and presents the results of the evaluation to the user 80. The user continues to work on the quiz and receive an evaluation of his or her answers until the user notifies the system that he or she is done. The system then returns to the top level loop and waits for the next user action.

In case (5), quit 50, the user notifies the system that the session is finished, and the system stops 82.

Description of the System States

Figure 6:
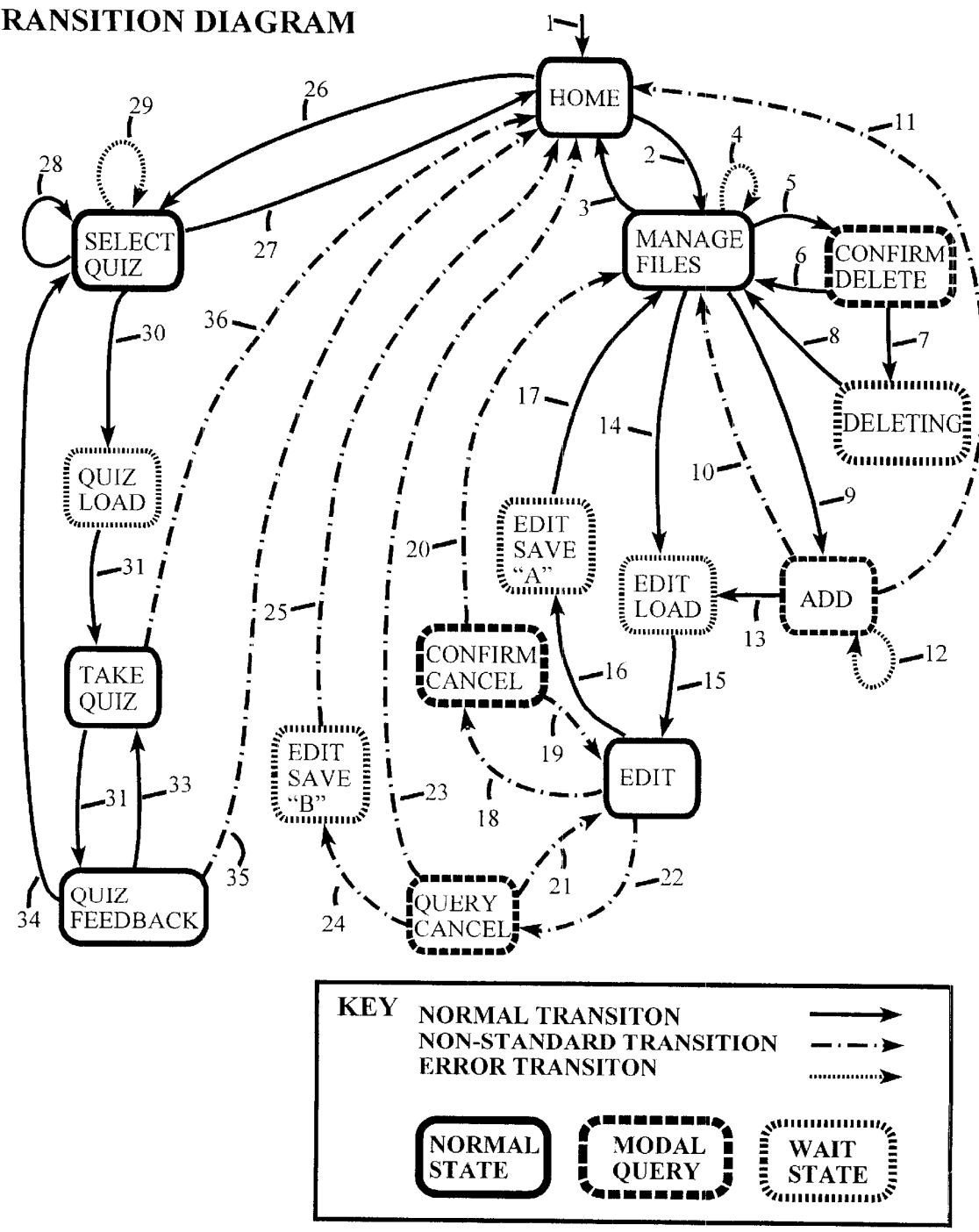
FIG. 6 is a system state transition diagram.

FIG. 6 presents a state transition diagram for the flow of control of a preferred embodiment of the invention. Table 1 documents the transitions of FIG. 6.

The ID column in the table refers to the transition labels on the diagram. Each transition takes the system from one state (indicated in the FROM column) to another state (indicated in the TO column). A transition is triggered by a particular event (shown in the EVENT column) occurring while the system is in a particular state. (Note that the state of the system determines the set of possible events.) In response to the event, the system will take actions as indicated in the ACTION column and will enter the TO state. The NOTES column elaborates on the event or actions taking place and are not part of the formal specification. For clarity, the diagram and the table only show those error transitions that may be caused by user action; they do not show possible errors (such as network communication failures) that may arise within the system.

TABLE 1

| ID | FROM | TO | EVENT | ACTION | NOTES |
|---|---|---|---|---|---|
| 1 | N/A | Home | System start | Initialize system Display home screen | Initialization may include an account login function |
| 2 | Home | Manage files | "Files" requested | Display files screen | |
| 3 | Manage files | Home | "Home" requested | Display home screen | |
| 4 | Manage files | Manage files | "Edit" or "Delete" requested and no files selected | Show error message | |
| 5 | Manage files | Confirm delete | "Delete" requested | Display confirm delete screen | Asks user to confirm |
| 6 | Confirm delete | Manage files | "No" requested | Display files screen | User canceled delete action |
| 7 | Confirm delete | Deleting | "Yes" requested | Delete file | User confirmed delete action |
| 8 | Deleting | Manage files | File deleted | Display files screen | |
| 9 | Manage files | Add | "Add" requested | Display add screen | |
| 10 | Add | Manage files | "Cancel" requested | Display files screen | No file added |
| 11 | Add | Home | "Home" requested | Display home screen | No file added |
| 12 | Add | Add | "Ok" requested and data contains errors | Show error message | File type or name not indicated, or duplicate file name entered |
| 13 | Add | Edit load | "Ok" requested and all data acceptable | Create file Start loading editor Display edit load screen | Enter wait state: tells user that editor is loading |
| 14 | Manage files | Edit load | "Edit" requested and file selected | Start loading editor Start loading file data Display edit load screen | Enter wait state: tells user that editor and file data are loading |
| 15 | Edit load | Edit | File data and editor loaded | Display edit screen | |
| 16 | Edit | Edit save "A" | "Ok" requested | Start storing file data Display edit save "A" screen | Wait state: tells user that file data is being saved |
| 17 | Edit save "A" | Manage files | File data saved | Display files screen | |
| 18 | Edit | Confirm cancel | "Cancel" requested | Display confirm cancel screen | Ask user to confirm cancel |
| 19 | Confirm cancel | Edit | "No" requested | Display edit screen | User canceled cancel edit action |
| 20 | Confirm cancel | Manage files | "Yes" requested | Abandon all changes Display files screen | User confirmed cancel edit action |
| 21 | Edit | Query cancel | "Home" requested | Display query cancel screen | Ask user whether to save the data |
| 22 | Query cancel | Edit | "Cancel" requested | Display edit screen | User canceled home action |
| 23 | Query cancel | Home | "Do not save" requested | Abandon all changes Display home screen | |
| 24 | Query cancel | Edit save "B" | "Save" requested | Start storing file data Display edit save "B" screen | Enter wait state: tells user that file data is being saved |

TABLE 1-continued

| ID | FROM | TO | EVENT | ACTION | NOTES |
|---|---|---|---|---|---|
| 25 | Edit save "B" | Home | File data saved | Display home screen | |
| 26 | Home | Select quiz | "Quiz" requested | Display select quiz screen | |
| 27 | Select quiz | Home | "Home" requested | Show home screen | |
| 28 | Select quiz | Select quiz | Quiz type selection changed | Update compatible files list | |
| 29 | Select quiz | Select quiz | "Ok" requested but quiz type and/or files not selected | Show error message | |
| 30 | Select quiz | Quiz load | "Ok" requested and quiz type and file(s) selected | Start loading quiz generator Start loading file data Display quiz load screen | |
| 31 | Quiz load | Take quiz | Quiz generator and file data loaded | Generate quiz Display quiz screen | Quiz screen determined by quiz generator |
| 32 | Take quiz | Quiz feedback | "Check" requested | Analyze answers Display feedback screen | Contents of feedback screen depend on answers and analysis rules |
| 33 | Quiz feedback | Take quiz | "Continue" requested and quiz is not over | Display quiz screen | May be a return to the same quiz page to correct errors or to a subsequent page |
| 34 | Quiz feedback | Select quiz | "Done" requested and quiz is over | Display select quiz screen | User completed quiz |
| 35 | Quiz feedback | Home | "Home" requested | Display home screen | User abandoned quiz without finishing |
| 36 | Take quiz | Home | "Home" requested | Display home screen | User abandoned quiz without finishing |

When the system starts, transition 1 is executed and the system enters the Home state. Thereafter, there is no requirement that events occur in a particular order. However, a typical sequence of transitions might be as shown in Table 2.

TABLE 2

| ID | EVENT: ACTION | USER'S VIEW |
|---|---|---|
| 1 | System start: initialize system and display home screen | User initiates session. System displays home screen with options to edit files or take quiz. User selects edit files. |
| 2 | "Files" requested: display files screen | System displays a list of user's files with options to return to home screen or to delete or create a new file. User selects option to create a new file. |
| 9 | "Add" requested: display add screen | System displays options for selecting structured learning material type. User selects type, and clicks "OK." |
| 13 | "OK" requested and all data acceptable: create file, start loading editor, display edit load screen | System displays "loading" message while editor software is retrieved and downloads. |
| 15 | File data and editor loaded: display edit screen | System displays editing screen. User adds data. User clicks "OK." |
| 16 | "OK" requested: start storing file data, display edit save "A" screen | System displays "saving" message while data is being saved. |
| 17 | File data saved: display files screen | System displays a list of user's files with options to return to home screen or to delete or create a new file. User selects option to return to home screen. |
| 3 | "Home" requested: display home screen | System displays home screen with options to edit files or take quiz. User selects take a quiz. |
| 26 | "Quiz" requested: display select quiz screen | System displays a list of available quiz types with options to return to home screen or select quiz type. User selects quiz type. System displays list of user's files compatible with the quiz type. User selects one or more user's files. User clicks "OK." |
| 30 | "OK" requested and quiz type and file(s) selected: start loading quiz generator, start loading file data, display quiz load screen | System displays "loading" message while quiz software is retrieved and downloads. |
| 31 | Quiz generator and file data loaded: generate quiz, display quiz screen | System displays quiz screen. User inputs quiz answers, and clicks "CHECK." |

TABLE 2-continued

| ID | EVENT: ACTION | USER'S VIEW |
|---|---|---|
| 32 | "Check" requested: analyze answers, display feedback screen | System displays quiz score and quiz feedback. User clicks "CONTINUE." |
| 33 | "Continue" requested and quiz is not over: display quiz screen | System displays quiz screen. User corrects errors. User clicks "CHECK." |
| 32 | "Check" requested: analyze answers, display feedback screen | System analyzes answers, displays a list of user feedback messages and allows the user to browse the list. User clicks "DONE." |
| 34 | "Done" requested and quiz is over | System displays a list of available quiz types with options to return to home screen or select quiz type. User selects option to return to home screen. |
| 27 | "Home" requested: show home screen | System displays home screen with options to edit files or take quiz. |

EXAMPLES OF THE PREFERRED IMPLEMENTATION

What follows are five examples which together show how two structured learning material types and three quiz types can be implemented within the architecture of the invention. The structured learning material types are: a word/definition list and topical notes. The quiz types are: matching; alphabetize words; and multiple choice. It should be understood that these examples are illustrative only and that other methods of implementing specific learning material structures and quiz types may readily be used.

All references to System Functions in this section refer to FIG. 4.

Example 1

For the first example, the structured learning material is a word/definition list, each entry having the following data elements:

word—the word that is the subject of this entry definition—a single definition of the word Entries are stored in the system in Function (2) using an editor which supports the word/definition list data structure.

The quiz type for this example is matching. The input data structure for this quiz type is a set of ordered pairs of strings. There are no restrictions on the content of the strings or the maximum size of the set; however, there must be at least two distinct first elements and at least two distinct second elements among the ordered pairs. In Function (3), the user selects the matching quiz type. The system then displays all structured learning material data sets having a data structure mapping module for transforming them into a set of ordered pairs of strings. This will include all word/definition lists. The user selects one or more of the displayed structured learning material data sets. Function (3) then retrieves and invokes the appropriate data structure mapping module(s). When invoked, the module(s) create all of the ordered pairs of strings from the selected structured learning material data set(s), and places them in an output array. This array becomes the quiz generation data used in Function (4).

As a concrete example, consider the following word/definition list that might have been created by or for someone learning Spanish:

TABLE 3

| Word | Definition |
|---|---|
| la cuchara | spoon |
| el tenedor | fork |

TABLE 3-continued

| Word | Definition |
|---|---|
| el cuchillo | knife |
| la olla | pot |
| el cazo | ladle |
| el cucharón | ladle |
| el plato | dish |
| el plato | plate |
| el cedazo | sieve |
| el tamiz | sieve |

The data structure mapping module creates a set of ten ordered pairs of strings from this list, where the first element of an ordered pair is a word and the second element is a definition.

In Function (4), the quiz generation module for the matching quiz is invoked. This module computes the quiz presentation and analysis rules as follows. First, the quiz layout is designed. The set of ordered pairs are shuffled and then divided into pages of no more than ten entries each. The pairs are divided as evenly as possible among the number of necessary pages. For each page, the pairs are separated into a list of first elements (of ordered pairs) and a list of second elements (of ordered pairs). Associated with each first element is a list of matching second elements, initially containing a single item. The second elements are scanned for duplicates, duplicates are eliminated, and the lists associated with the first elements are updated accordingly. Next, the list of first elements is scanned for duplicates; these are eliminated and the corresponding lists of matching second elements are merged. (In this example, one of the words has multiple definitions, and, in two instances, two words share the same definition. Thus, there are actually nine distinct words and eight distinct definitions in the list) Finally, the list of first items for each page, which now contains no duplicates, is again shuffled.

For the example above, all entries fit on a single page. For this page, two lists are developed within Function (4). The first is a list of distinct second elements (definitions) indexed by number:

TABLE 4

| Index | Second Element (Definition) |
|---|---|
| 1 | spoon |
| 2 | fork |
| 3 | knife |
| 4 | pot |
| 5 | ladle |

TABLE 4-continued

| Index | Second Element (Definition) |
|---|---|
| 6 | dish |
| 7 | plate |
| 8 | sieve |

The second is a list of distinct first elements (words), indexed by number, with a list of all matching second element indices:

TABLE 5

| Match Index | First Element (Word) | Matching Second Element Indices |
|---|---|---|
| 1 | la cuchara | 1 |
| 2 | el tenedor | 2 |
| 3 | el cuchillo | 3 |
| 4 | la olla | 4 |
| 5 | el cazo | 5 |
| 6 | el cucharón | 5 |
| 7 | el plato | 6, 7 |
| 8 | el cedazo | 8 |
| 9 | el tamiz | 8 |

After the quiz layout is designed, Function (4) continues by generating rules for screen presentation and analysis. In the present example, the quiz is presented as a single page with a list of "drag-and-drop" words and a static background scene displaying a list of definitions to be matched, each definition on a separate row. The intent is for the user to employ the computer mouse to drag copies of each word and drop them within the row of the corresponding definitions. (As noted, a word may match more than one definition and vice versa.) FIG. 7 is a screen layout for the above lists.

Each analysis rule is a test on one word. These rules are divided into three groups: (1) to check that the user's answers are well-defined; (2) to provide hints to the user; and (3) to determine the user's score. The intention here is that all rules in the first group must be satisfied before any other rules are checked and that all rules in the second group must be satisfied before the rules of the third group are checked. In the first group, the rules express the requirements that each word that is used must be clearly placed on some definition row, and that at most one copy of any word may be placed on any particular definition row. In the second group, the rules check that each word is used at least once. The last group includes rules specifying that each definition row contain one copy of each word that matches that definition and no copies of each word that does not match that definition.

Function (4) assumes that the definitions will be displayed on consecutive rows, all of the same height. For each word w, and for each definition d, Function (4) computes a region on the screen such that when word w is anywhere in that region, it is "clearly placed" on the row containing definition d. The screen coordinates are a function of the display width and height of word w as well as the row of definition d. To illustrate, the screen coordinates corresponding to a correct placement of the word "el tenedor" on the row containing the definition "fork" are also shown in FIG. 7. These coordinates were computed by: (1) measuring the width and height of the screen image of the word "el tenedor," and (2) centering a rectangle in the row for "fork" whose width and height are the width and height of the row for "fork" minus, respectively, the width and height of the word "el tenedor." If the center of the image of the word "el tenedor" is in this inner rectangle, then the word is clearly placed on the row.

The rules of the first group state that:

for every word w, all copies of it appearing on the screen must be clearly placed on some definition row, and if any copy is not clearly placed, provide the user feedback, "All words must be fully inside definition rows."

for every word w, at most one copy of it may appear on any one definition row, and if more than one copy is placed on the same row, provide the user feedback, "I see too many here."

The rules of the second group state that:

for every word w, at least one copy of it must appear on the screen, and if any word is missing, provide the user feedback, "w has not been used."

The rules of the third group state that:

for every word w, at least one copy of it must appear on each definition row that it matches, and if it is missing from any matching definition row, provide the user feedback, "w goes here"

for every word w, no copy of it may appear on any definition row which it does not match, and if it does appear on an incorrect row, provide the user feedback, "w is not correct here"

In Function (5), the quiz module draws the background of rows of matching items (definitions) and the list of matches (words). The user, through the drag-and-drop interface, places copies of the words on the definition rows. The user then clicks on a "check" button and the system analyzes the answers. The system checks each rule against the coordinates of the words that have been placed on the background. If any rules are violated, the system displays a list of associated user feedback messages and allows the user to browse the list. As each message is displayed, the system highlights words or definition rows responsible for the violation. The user can then click on a "return" button to display the quiz screen once more and attempt to correct the errors. Should all rules be satisfied, the user has completed the page correctly and the system proceeds to the next page of the quiz, where the process is repeated. After the last page, the system reports the final score for the quiz. The score is computed as follows. First, the number of incorrectly placed words is subtracted from the number of correctly placed words. If this difference is negative, the score is zero. Otherwise, the score is the ratio of this difference to the number of possible correct placements.

Example 2

This second example shows how a different structured learning material type, topical notes, can also be used to generate a matching quiz. Topical notes represent information in a hierarchical format. A set of topical notes consists of one or more data elements of the form:

topic—word or phrase which summarizes or specifies the subject matter notes—a list of one or more words or phrases relating to the topic Topical note entries are stored in the system in Function (2) using an editor that supports the topical notes data structure.

In Function (3), the user selects the matching quiz type. As in the previous example, the system next displays all structured learning material data sets having a data structure mapping module for transforming them into a set of ordered pairs of strings. (Recall that the input data structure for this quiz module is a set of ordered pairs of strings.) The system contains a data structure mapping module that transforms topical notes into a set of ordered pairs of strings by generating an ordered pair for each note where the note is the second element of the pair and the corresponding topic is the first element. The user selects one or more of the displayed structured learning material data sets. Function (3) then retrieves and invokes the appropriate data structure mapping module(s). When invoked, the module(s) create all of the ordered pairs of strings from the selected structured learning material data sets, and places them in an output array. This array becomes the quiz generation data used in Function (4).

To illustrate this using a concrete example, consider the following topical notes that might also have been created by or for someone learning Spanish:

TOPIC: para el desayuno
el pan tostado
los huevos
el cereal
TOPIC: para el almuerzo
la ensalada
el sandwich
TOPIC: para la cena
el pollo
las verduras
el pan
la ensalada The data structure mapping module creates a set of nine ordered pairs of strings, as illustrated in the table below.

TABLE 6

| First Element (Topic) | Second Element (Note) |
| --- | --- |
| para el desayuno | el pan tostado |
| para el desayuno | los huevos |
| para el desayuno | el cereal |
| para el almuerzo | la ensalada |
| para el almuerzo | el sandwich |
| para la cena | el pollo |
| para la cena | las verduras |
| para la cena | el pan |
| para la cena | la ensalada |

In this example, there are actually three distinct topics, and eight distinct notes. The lists developed in Function (4) are:

TABLE 7

| Index | Second Element (Note) |
| --- | --- |
| 1 | el pan tostado |
| 2 | los huevos |
| 3 | el cereal |
| 4 | la ensalada |
| 5 | el sandwich |
| 6 | el pollo |
| 7 | las verduras |
| 8 | el pan |

TABLE 8

| Match Index | First Element (Topic) | Matching Second Element Indicies |
| --- | --- | --- |
| 1 | para el desayuno | 1, 2, 3 |
| 2 | para el almuerzo | 4, 5 |
| 3 | para la cena | 4, 6, 7, 8 |

Now, the generation of the quiz, the analysis rules, and the user feedback follows the same procedure as in the first example of the word/definition list. FIG. 8 shows a screen layout for the matching quiz for the above lists.

Example 3

As a third example, consider generating a matching quiz for the combination of a word/definition list and a set of topical notes. Once the user selects the structured learning material data sets in these forms, the system, in Function (3), determines that these structured learning material data sets each have a data structure mapping module for transforming them into a set of ordered pairs of strings. They are then transformed into this common input data structure, and combined into a single data quiz input set. Again, Function (4) and Function (5) proceed as in the examples above. As an example, consider a matching quiz generated from the word/definition list and topical notes in the previous two examples. The matching quiz that is generated is presented on two pages, because the number of distinct items to be matched exceeds ten. FIG. 9 shows screen layouts for both pages of the quiz.

This example also shows how information from a database representing a Spanish English dictionary can be used to generate additional quiz questions. A look-up operation may be included in Function (4), which might extract English translations for some or all of the words in the topical notes. Then, each Spanish word/English translation pair would be added to the combined list of ordered pairs generated from Function (3), and the extended quiz would be generated in Function (4) and presented and evaluated in Function (5) as before.

Example 4

The fourth example illustrates how a different quiz type can be automatically generated from the same word/definition list as was used in the previous examples for the matching quiz. The quiz type to be used as an example is the alphabetize words quiz, which presents the user with a list of words, and asks the user to arrange them in alphabetical order.

Entries are stored in the system in Function (2) using an editor which supports the word/definition list data structure.

The input data structure for the alphabetize words quiz module is a set of single words. A word is a string of characters without any blanks or punctuation. There are no restrictions on the content of the strings or the size of the set. In Function (3), the user selects the alphabetize words quiz type. The system then displays all structured learning material data sets having a data structure mapping module for transforming them into a set of single words. The system contains a module that performs this transformation for word/definition lists. The user selects one or more of the displayed structured learning material data sets. Function (3) then retrieves and invokes the appropriate data structure mapping module(s). When invoked, the module(s) create all of the sets of single words from the selected structured learning material data sets, and places them in an output array. This array becomes the quiz generation data used in Function (4).

In Function (4), the quiz generation module for the alphabetize words quiz is invoked. This module computes the quiz presentation and analysis rules as follows. First, the quiz layout is designed. The set of word/definition pairs are reduced to a set of single distinct words, up to fifteen distinct words are selected (to fit on a single display screen), a collating function is invoked to determine the proper alphabetical ordering of the selected list, and then the list is shuffled.

For the word/definition list in the first example, there are nine distinct words. The shuffled list below is developed within Function (4). Note that the definite articles "el" and "la" have been removed by the data structure mapping module.

TABLE 9

| Word | Alphabetical Index |
| --- | --- |
| cedazo | 2 |
| tenedor | 9 |
| cuchillo | 5 |
| tamiz | 8 |
| cazo | 1 |
| plato | 7 |
| cucharón | 4 |
| cuchara | 3 |
| olla | 6 |

After the quiz layout is designed, Function (4) continues by generating rules for screen presentation and analysis. In this example, the quiz is presented as a single page with a list of "drag-and-drop" words on the right of a static background scene, along with a vertical array of nine blank lines to the left. The intent is for the user to employ the computer mouse to drag the words and drop them onto the blank lines, so that the resulting list is in alphabetical order. Function (4) assumes that the region of the screen which includes the blank lines is fully separate from the initial location of the list of words. FIG. 10 is a screen layout for the above list.

For the alphabetize words quiz, the analysis rules are divided into two groups: (1) to check that the user's answers are well-defined; and (2) to determine the user's score. The intention here is that all rules in the first group must be satisfied before the rules of the second group are checked. In the first group, the rules express the requirements that each used word must be placed on the left side of the screen, lie fully on a single blank line, and that at most one word is on any line. The second group includes rules that each line contain no word that belongs on a line below and no word that belongs on a line above. (Note that, if all rules of group (1) are satisfied, group (2) need not contain rules that each line contain the word appropriate to that line.)

Function (4) assumes that the blank lines will be on numbered, consecutive rows, all of the same height. For each word w, and for each blank line, Function (4) computes a region on the screen such that when word w is anywhere in that region, it "lies fully" on that line. The screen coordinates are a function of the display width and height of word w as well as the screen position and width of the blank line. To illustrate, the screen coordinates corresponding to a correct placement of the word "cucharón" on line number 4 are also shown in FIG. 10. These coordinates were computed by: (1) measuring the width and height of the screen image of the word "cucharón," and (2) centering a rectangle in the row for line 4 whose width and height are the width and height of the row for line 4 minus, respectively, the width and height of the word "cucharón." If the center of the image of the word "cucharón" is in this inner rectangle, then the word lies fully on the line.

The rules of the first group state that:
every word w must be placed on the left side of the screen, and if any copy is not so placed, provide the user feedback, "Place all words in the list."
every word w must lie fully on a line, and if it is not, provide the user feedback, "w must be on a numbered line."
every line must contain exactly one word w that lies fully on it, and if it does not, provide the user feedback, "Put one word on each line."

The rules of the second group state that:
no word w is on a line above its proper one. If it is, provide the user feedback, "w goes later in the list"
no word w is on a line below its proper one. If it is, provide the user feedback, "w goes earlier in the list"

In Function (5), the quiz module draws the background of blank lines and the list of words. The user, through the drag-and-drop interface, places the words on the blank lines. The user then clicks on a "check" button and the system analyzes the answers. The system checks each rule against the coordinates of the words that have been placed on the background. If any rules are violated, the system displays a list of associated feedback messages and allows the user to browse the list. As each message is displayed, the system highlights words or lines responsible for the violation. The user can then click on a "return" button to display the quiz screen once more and attempt to correct the errors. Should all of the formatting rules be satisfied, the system reports the final score for the quiz. The score is computed by awarding one point for each line containing a word that properly comes later in the alphabet than the word placed on the preceding line, summing those points, and then dividing this sum by the total number of words.

Example 5

The fifth example illustrates how a third quiz type, that of multiple choice, can be automatically generated from the same structured learning material types as were used before, namely the word/definition list, topical notes, and the two types combined. This will further demonstrate the reusability of the materials, without any modifications.

For this example, the multiple choice quiz type presents the user with up to fifteen multiple choice questions, and asks the user to select a preferred response for each.

The input data structure for this quiz type is a set of ordered pairs of strings. There are no restrictions on the content of the strings or the maximum size of the set; there must be at least four distinct first elements and four distinct second elements among the ordered pairs. In Function (3), the user selects the multiple choice quiz type. The system then displays all structured learning material data sets having a data structure mapping module for transforming them into a set of ordered pairs of strings. This will include all word/definition lists and all topical notes, as seen in previous examples. The user selects one or more of the displayed structured learning material data sets. Function (3) then retrieves and invokes the appropriate data structure mapping module(s). When invoked, the module(s) create all of the ordered pairs of strings from the selected structured learning material data sets, and places them in an output array. This array becomes the quiz generation data used in Function (4).

As a concrete example, consider again the same word/definition list as was used previously, repeated here for convenience:

TABLE 10

| Word | Definition |
| --- | --- |
| la cuchara | spoon |
| el tenedor | fork |
| el cuchillo | knife |

TABLE 10-continued

| Word | Definition |
| --- | --- |
| la olla | pot |
| el cazo | ladle |
| el cucharón | ladle |
| el plato | dish |
| el plato | plate |
| el cedazo | sieve |
| el tamiz | sieve |

In Function (4), the quiz generation module for the multiple choice quiz is invoked. A multiple choice quiz is a set of multiple choice questions, where each question consists of the question text, the preferred answer, and three distracters. This module computes the quiz presentation and preferred answers as follows. For each ordered pair in the input data structure, the system attempts to generate two multiple choice questions. For the first question, the first element in the ordered pair (e.g., the word in a word/definition list) is taken as the question text, and the second element in the ordered pair (i.e. the definition in a word/definition list) is taken as the preferred answer. To generate the distracters for the first question, the system randomly selects three distinct definitions that do not have the question text as a corresponding first element in any ordered pair of the input data structure. For the second question, the second element in the ordered pair (i.e. the definition in a word/definition list) is taken as the question text, and the first element in the ordered pair (i.e. the word in a word/definition list) is taken as the preferred answer. To generate the distracters for the second question, the system randomly selects three distinct words that do not have the question text as a corresponding second element in any ordered pair of the input data structure. In either case, if three distracters cannot be found, the multiple choice question is not generated. A maximum of fifteen questions are randomly selected from the set of generated multiple choice questions. The positions of the preferred answers within each question are randomized, as is the order of the questions themselves.

For the example above, the data structure mapping module produces ten ordered pairs as the input data structure, which results in up to twenty distinct question text/preferred answer pairs. The table below shows one possible table of data for twenty multiple choice questions. Additionally, for each distracter, the system also generates a list of all properly associated related elements, to be used later in presenting feedback on incorrect answers. This is not shown in the table.

TABLE 11

| Question Text | Preferred Answer | Distracter | Distracter | Distracter |
| --- | --- | --- | --- | --- |
| la cuchara | spoon | fork | ladle | plate |
| el tenedor | fork | knife | ladle | sieve |
| el cuchillo | knife | spoon | plate | fork |
| la olla | pot | spoon | dish | ladle |
| el cazo | ladle | fork | plate | dish |
| el cucharón | ladle | knife | sieve | plate |
| el plato | dish | knife | spoon | fork |
| el plato | plate | pot | fork | knife |
| el cedazo | sieve | ladle | knife | pot |
| el tamiz | sieve | spoon | ladle | pot |
| spoon | la cuchara | el tenedor | la olla | el cazo |
| fork | el tenedor | el cuchillo | el cazo | el cucharón |
| knife | el cuchillo | el tamiz | el cucharón | el plato |

TABLE 11-continued

| Question Text | Preferred Answer | Distracter | Distracter | Distracter |
| --- | --- | --- | --- | --- |
| pot | la olla | el tamiz | el cazo | el tenedor |
| ladle | el cazo | la cuchara | el plato | el cedazo |
| ladle | el cucharón | el tenedor | el cedazo | el tamiz |
| dish | el plato | el cuchillo | el tamiz | el tenedor |
| plate | el plato | la olla | el tenedor | el cuchillo |
| sieve | el cedazo | el cazo | el cuchillo | la olla |
| sieve | el tamiz | la olla | el cuchillo | el cazo |

After the quiz layout is designed, Function (4) continues by generating the screen presentation and analysis. In the present example, the quiz is presented as a single page with an answer area consisting of fifteen numbered rows of four "radio buttons" each, labeled a, b, c, and d, on the right, and a scrolling text area for the list of questions on the left. The intent is for the user to employ the computer mouse to select the row/letter combination in the answer area corresponding to each associated question. FIG. 11 is a screen layout corresponding to the above table.

The analysis rules are a list of the correct letter answers for each of the questions. The feedback for each incorrect answer is the list of all properly associated related elements, and letter label for the correct answer. The score is computed as the number of correct answers divided by the total number of questions.

A multiple choice quiz may also be generated from structured learning material in the form of topical notes, because there is a data structure mapping module for transforming topical notes into a set of ordered pairs. This was shown previously in example 2. The ordered pairs are transformed into a set of multiple choice questions as described above. For the topical notes example data shown previously, there are only three distinct first elements for the ordered pairs, so there will be at most three multiple choice questions generated. The table below shows one possible table of data for three multiple choice questions.

TABLE 12

| Question Text | Preferred Answer | Distracter | Distracter | Distracter |
| --- | --- | --- | --- | --- |
| para el desayuno | el cereal | la ensalada | las verduras | el pan |
| para el almuerzo | la ensalada | el pan | el cereal | los huevos |
| para la cena | el pollo | el cereal | los huevos | el pan tostado |

A screen layout corresponding to this table is shown in FIG. 12.

A further example of the system's capabilities is the generation of a multiple choice quiz from the combination of a word/definition list and a set of topical notes. Here, each structured learning material data set is transformed into a set of ordered pairs, the sets of ordered pairs are combined into a single set of ordered pairs, and the quiz and feedback generation proceed as in the two prior cases.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed is:

1. Educational software on a computer-interpretable medium using a computer for generating quizzes, comprising:
   A. a data storage system including:
      1. a user database management system containing and maintaining a structured learning material database for storing structured learning material data sets created by a user, each data set being free of data specific to the generation of quizzes;
      2. a software module database management system containing and maintaining:
         a. a structured learning material editor module database containing at least one structured learning material editor module, at least one editor module being selectable for use in editing structured learning material data sets
         b. an extensible quiz module database containing at least one quiz module, each quiz module including a generator, a presenter, and an analyzer, the generator transforming structured learning material data sets into screen presentation data and quiz answer analysis rules, the presenter displaying the quiz to the user, accepting a user's answers to the quiz and displaying analysis results to the user on those answers; and the analyzer evaluating a user's answers to a presented quiz using the answer analysis rules provided by the generator; whereby quizzes may be dynamically generated from the structured learning material data sets entered by a user, and whereby additional quiz modules which can generate quizzes from structured learning material data sets already contained in the data storage system may be added to said quiz module database;
   B. a user interface for selecting system control functions, editing structured learning materials, presenting quizzes, receiving user answers to quizzes, and displaying quiz analysis results; and
   C. a control system for retrieving software modules from the software module database management system and activating them.

2. Educational software as defined in claim 1 wherein the software module database management system further contains and maintains
   a data structure mapping module database, containing at least one data structure mapping module, each data structure mapping module being usable
   to transform structured learning material data sets into input data for a quiz module.

3. Educational software as defined in claim 2, wherein said quiz module examines said data storage system to select at least one structured learning material data set which is consistent with a selected quiz type.

4. Educational software as defined in claim 1, wherein said quiz module examines said data storage system to select at least one structured learning material data set which is consistent with a selected quiz type.

5. Educational software as in claim 1, including a user identification and authentication system and wherein said structured learning material database is segregated into distinct areas by user.

6. Educational software as in claim 5, including means to transfer data between different user areas.

7. Educational software as in claim 1 wherein said user database management system also maintains a record of a user's past results on quizzes.

8. Educational software as in claim 7 wherein the quiz module uses said record of past results to generate quizzes that reinforce items for which the user has previously provided incorrect answers.

9. Educational software as defined in claim 1 wherein the analyzer is capable of: (i) customized methods of quiz evaluation; and (ii) evaluating each answer independently; and (iii) evaluating an entire corpus of answers as a unit; and wherein the quiz module is capable of: (i) providing hints and suggestions as to the correct answers with or without scoring; and (ii) adjusting the level of feedback for the analysis results to suit the user.

10. Educational software as defined in claim 1 wherein there are alternative methods for implementing the various database systems, and (i) the data storage system is the local file system of the computer, and/or (ii) the data storage system is implemented using server scripts accessed over a computer network, and/or (iii) the data storage system is a commercial database management system.

11. Educational software as in claim 1 wherein a portion of the educational software is arranged to operate as an applet within a browser or other applet viewing program, and to operate on more than one computer system.

12. Educational software as in claim 11 wherein the control system permits users to take quizzes collaboratively.

13. Educational software as defined in claim 1 wherein quizzes are generated using data obtained from sources other than the selected structured learning material data sets in addition to data present in the selected structured learning material data sets.

14. A computerized educational method, comprising:
   a. providing a plurality of quiz types;
   b. providing a plurality of structured learning material data sets, each data set being of one of a plurality of structured learning material types and each data set being free of data specific to the generation of quizzes;
   c. providing for user selection of one of the plurality of quiz types and one or more structured learning material data sets, such that the selected data set types are compatible with the selected quiz type;
   d. dynamically generating a computerized quiz of the selected type using the selected structured learning material data sets, said generated quiz being capable of receiving input in the form of answers from the user in response to the quiz;
   e. receiving user input of answers to the quiz;
   f. analyzing answers to the quiz provided by the user according to a set of analysis rules; and
   g. delivering the results of the analysis to the user.

15. An educational method as defined in claim 14 further comprising:
   a. providing a plurality of structured learning material editors, one for each structured learning material type;
   b. providing a repository for storing structured learning material data sets of a multiplicity of types;
   c. providing for user selection of one of the plurality of different structured learning material data set editors;
   d. entering a new structured learning material data set of a particular type into said repository using the selected editor, each data set so entered being free of data specific to the generation of quizzes;
   e. providing for user naming of structured learning material data sets so entered;
   f. modifying structured learning material data sets previously entered in said repository;

g. deleting structured learning material data sets from said repository.

17. An educational method as defined in claim 15 further comprising the step of providing for user selection of the next action to be performed, said action including creating structured learning material, editing existing structured learning material, deleting structured learning material, taking a quiz, and stopping the system.

17. An educational method as defined in claim 15 wherein the quiz is generated using data obtained from sources other than the selected structured learning material data sets in addition to data present in the selected structured learning material data sets.

18. A method as defined in claim 14, further comprising adding additional quiz types which are selectable by the user for generating quizzes from structured learning material data sets already contained on the computer-interpretable medium.

19. An automated educational method for a user, comprising:
   a. selecting one of a number of different quiz types available on a computer;
   b. selecting one or more structured learning materials data sets which are available on a computer and are compatible with the selected quiz type, each data set being free of data specific to the generation of quizzes;
   c. dynamically generating and presenting a quiz in the form of the quiz type selected in step a. using the data selected in step b;
   e. receiving user input of answers to the quiz; and
   f. evaluating the answers.

20. The educational method defined in claim 19 wherein a user first selects a single structured learning material data set and then selects one of said quiz types available which are compatible with the selected data set.

21. The educational method defined in claim 20 wherein a user selects multiple data sets of the same structured learning material type.

22. The educational method defined in claim 21 further comprising:
   a. modifying one of a number of structured learning material data sets available on a computer; and
   b. deleting a structured learning material data set from the computer.

23. The educational method defined in claim 19 further comprising:
   a. a user modifying quiz answers after receiving an evaluation of quiz answers; and
   b. receiving an evaluation of the modified answers.

24. The educational method of claim 19 further comprising:
   a. selecting one of a plurality of structured learning material editors; and
   b. entering a new structured learning material data set so it is available for selection for quizzes, each such data set entered being free of data specific to the generation of quizzes.

25. In educational software on a computer-interpretable medium using a computer for presenting quizzes, of the type which includes a user interface for controlling and interacting with the software and a control system of retrieving and activating software modules from the software module database management system, the improvement comprising: a data storage system including:

A. a user database management system containing and maintaining a structured learning material database for storing structured learning material data sets created by a user, each data set being free of data specific to the generation of quizzes; and
   B. a software module database management system containing and maintaining:
      1. a structured learning material editor module database containing at least one structured learning material editor module, at least one editor module being selectable for use in editing structured learning material data sets in response to a request through the user interface;
      2. an extensible quiz module database containing at least one quiz module, each quiz module including a generator, a presenter, and an analyzer, the generator transforming structured learning material data sets into screen presentation data and quiz answer analysis rules for a quiz, the presenter, through the user interface, displaying the quiz to the user, accepting a user's answers to the quiz and displaying analysis results to the user on those answers, and the analyzer evaluating a user's answers to a presented quiz using the answer analysis rules provided by the generator, whereby quizzes may be dynamically generated from the structured learning material data sets entered by a user, and whereby additional quiz modules which can generate quizzes from structured learning material data sets already contained in the data storage system may be added to said quiz module database.

26. Educational software on a computer-interpretable medium using a computer comprising:
   a. a data storage system for storing a plurality of structured learning material data sets of different structured learning material types;
   b. a structured learning material editor set, each element of the set being a software module for editing at least one of a plurality of different structured learning material data sets each data set being free of data specific to the generation of quizzes each being free;
   c. a dynamic quiz generator having at least one quiz module for transforming input data into screen presentation data and quiz answer analysis rules for a quiz and displaying the quiz to the user, accepting a user's answers to the quiz and displaying analysis results to the user on those answers; and evaluating a user's answers to a presented quiz using answer analysis rules whereby quizzes are dynamically generated using one or more of the structured learning material data sets, and quiz modules may be added which operate with data sets already contained in the data storage system;
   d. a user interface for presenting data generated from the selected structured learning materials data set in the form of a selected quiz type for the student to take using the computer; and
   e. a quiz evaluation system for evaluating the student's results of a presented quiz using the rules for analyzing the quiz answers provided by the quiz generator.

* * * * *